Oct. 31, 1933.           O. G. ALMCRANTZ           1,933,358
                           OUTLET BOX
                        Filed April 15, 1929
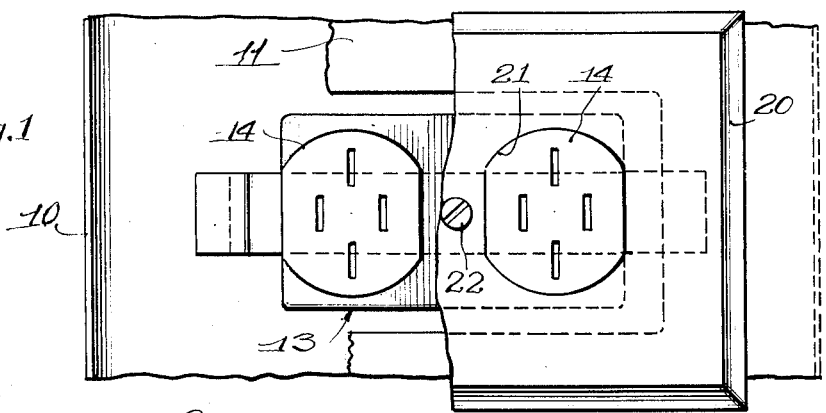
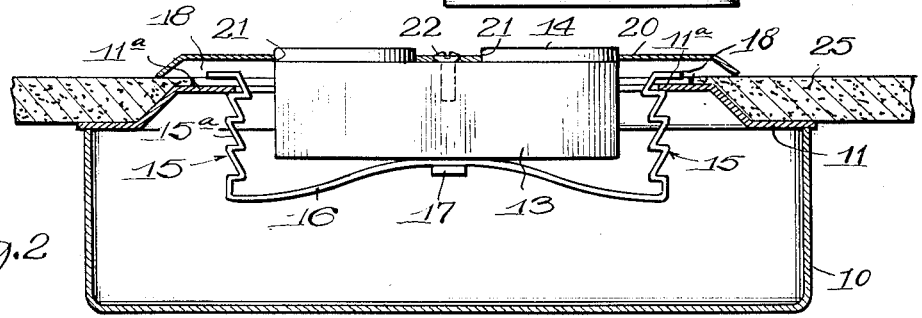
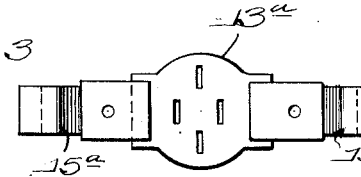
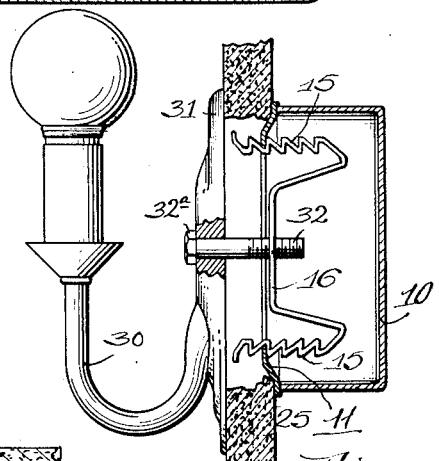
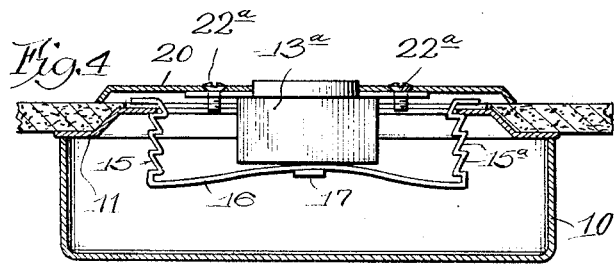
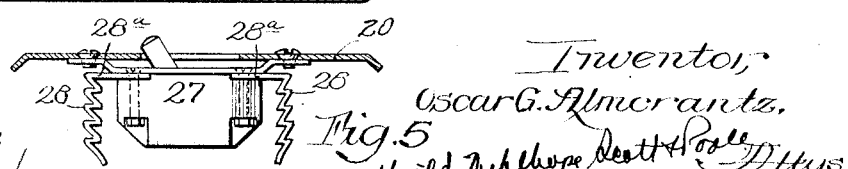

Patented Oct. 31, 1933

1,933,358

UNITED STATES PATENT OFFICE 1,933,358

OUTLET BOX

Oscar G. Almcrantz, Evanston, Ill., assignor of one-half to Edward L. Kappelman, Evanston, Ill.

Application April 15, 1929. Serial No. 355,040

8 Claims. (Cl. 247—19)

This invention relates to improvements in electrical conduit outlet boxes and fixtures usually connected therewith, such as receptacles, switches, and lighting fixtures, and has for its principal object to provide a new and improved construction of attaching means for fixtures of the character described, whereby said fixtures may be quickly and readily applied to their outlet box, and at the same time affording adjustment for varying thicknesses of wall material surrounding the margins of said box.

A further object is to provide means in combination with the cover plate commonly used with such fixtures whereby said fixtures are permitted a limited relative angular or transverse adjustment in a plane parallel to the face of the outlet box and yet by cooperation of the fixture and said plate when they are finally secured together, they are securely held relative to the outlet box.

As at present constructed, various types of fixtures, such as single and double receptacles and switch units are mounted in outlet boxes by means of laterally extending arms which span the opening in the outlet box cover and are provided with slots through which screws are applied and secured in registering screw holes formed in the margin of the outlet box cover. After the fixture is so secured to said cover, a cover plate is then fitted over the receptacle, the edges of said plate extending beyond the opening formed in the wall and engaging the outer surface of said wall, said plate being secured to the receptacle or its cross bar by means of one or more screws. In practice, however, there are several objections to the standard construction above mentioned. For instance, the provision of single screw holes on opposite margins of the outlet box cover affords very little lateral adjustment of the fixture when it is attached thereto, and these screw holes often become filled with plaster which is generally applied to the wall after the outlet boxes are put in place and before the fixtures are installed therein. Unless extreme care is used beforehand by the plasterer to avoid encroaching upon the margins of the outlet box cover, much time is lost by the electrician in finding and cleaning out these screw holes.

Furthermore, the plaster or other material surrounding the outlet box cover often varies considerably in thickness and when the cover plate is finally put over the opening and secured to the fixture, there is often a wide variation in distance between said cover plate and the fixture to which it is attached, and as a result it is almost impossible to insure a uniform relationship between the cover plate and the fixture beneath it. In order to eliminate this difficulty, various devices have been provided, as for instance, washers are often interposed between the fixture and the outlet box cover, but manifestly the installation of such devices require considerable time and trouble in providing a proper fit in each case.

In carrying out my invention, I provide an improved arrangement for connecting and assembling the fitting and its cover plate to the outlet box without the use of screws or like securing devices, whereby the fitting together with its cover plate are initially inserted in the outlet box at an approximately proper depth relative to the box and the surrounding wall, and thereafter by screwing the plate more tightly to the fitting, the securing means is yieldingly brought into tightly fitting engagement with the outlet box cover and securely held therein, but with said plate and fitting disposed at a substantially uniform position relative to each other, regardless of the thickness of the intervening plaster.

As will also hereinafter appear, my invention can be utilized for attaching lighting fixtures directly to the outlet box.

The invention may best be understood by reference to the accompanying drawing, in which Figure 1 is a plan view showing one embodiment of my invention as applied to an outlet box and double receptacle fixture assembly of standard type and with a portion of the cover plate broken away to show the arrangement of parts beneath.

Figure 2 is a transverse section of the double receptacle fixture assembly as shown in Figure 1.

Figure 3 is a plan view of a single receptacle fixture constructed in accordance with my invention.

Figure 4 is a transverse section showing the single receptacle fixture in assembled position in an outlet box.

Figure 5 is another form of fixture comprising a switch member constructed in accordance with my invention and provided with a modified form of adjustable attaching means for engagement with the margin of the outlet box cover.

Figure 6 is a sectional view showing a modified form of my invention as applied to a lighting fixture.

Referring now more particularly to details of the invention as embodied in the form shown in Figures 1 and 2, the box body 10 and cover 11 may be of standard form heretofore utilized in the art. Although in the form shown the box is rectangular, it is manifest that other shapes of boxes may be utilized if desired. The box may be secured in place by any suitable form of hanger, not shown.

The box cover 11 is provided with a fixture opening defined by opposite margins 11a, 11a, which are usually, but not necessarily, elevated with respect to the main body portion of the cover, as shown.

The receptacle 13 of the double type shown in Figures 1 and 2, may be of standard construction comprising circular members 14, 14 each having the usual plural slotted terminals adapted to be engaged by prongs of detachable terminal plugs of standard form, not shown.

The securing means for the receptacle 13 comprises a pair of oppositely disposed notched members or arms 15, 15 which are yieldingly secured to the receptacle as, for instance, by a cross member 16 connected centrally of the under face of the receptacle by means of a screw 17, or the like. In the form shown, the notched members 15, 15 and the cross member 16 are formed of a continuous piece of spring metal, the notches 15a, 15a being formed by corrugating said metal strip so as to form upwardly facing horizontal shoulders, connected by downwardly and inwardly inclined portions. This permits the members to be readily inserted in the fixture opening.

The upper end of each of the members 15 is flanged outwardly at 18.

The cover plate 20 is of the usual type having apertures 21, 21 therein through which the rounded portions 14, 14 of the double receptacle project. Said cover plate is secured to the receptacle body by adjustable clamping means, preferably comprising a center screw 22.

The use and operation of the device above described is as follows:

It will be understood that after the outlet box has been secured in place by means of its usual hanger or other securing devices, plaster 25 is applied to the wall and surrounding the margins 11a, 11a of the outlet box cover 11. The thickness of this plaster may vary considerably, depending upon the proper initial position of the outlet box, on the one hand, or the skill of the plasterer, on the other. After the plastering is completed, the receptacle is applied and secured to the box in the following manner: The cover plate 20 is loosely secured to the receptacle by only partly screwing in the screw 22, and the entire receptacle is then pressed into the opening in the box cover between the margins 11a, 11a. The notches 15a of the upright arms 15 engage the margins of the cover as the receptacle is inserted, but owing to the resilient connnection of these arms, and the shape of the notches, the receptacle may be inserted to a point where the loosely connected cover plate 20 engages the outer surface of the plaster 25. In the form shown in Figure 2, it appears that the receptacle has been inserted to the last pair of notches 15a, but it is manifest that in case the plaster were of greater thickness, the margins of the cover plate would become engaged in a lower pair of notches when the cover plate first engages the outer surface of the plaster. In this position with the screw 22 still loosely connecting the cover plate with the receptacle, the entire receptacle and cover plate are still capable of relatively limited movement transversely of the margins 11a, 11a as well as slight angular adjustment relative thereto, so that said cover plate and receptacle are capable of being adjusted slightly, if required to line it up with panels, moldings, or like members surrounding said receptacle. After such adjustment, however, the receptacle is finally secured in place by screwing down screw 22. This movement draws the receptacle and plate together into their final position, as shown in Figure 2, and simultaneously places the notched arms 15, 15 and the connecting spring member 16 under tension against the margins 11a, 11a of the outlet box cover, thus securely holding the receptacle and cover in its final position. When so held, the tension produced on the notched members is fully sufficient to maintain the parts in position against accidental displacement until such time as the tension is relieved on said members by unscrewing screw 22. Final withdrawal of the notched members may be facilitated by a tool, or by slightly twisting the same in the box cover.

In the modified form illustrated in Figures 3 and 4, my invention is shown as applied to a single receptacle 13a. The construction of parts is the same as that illustrated in connection with double receptacle shown in Figures 1 and 2, excepting that the cover plate 20 is secured to the receptacle body 13a by means of a pair of screws 22a, 22a on opposite sides of the receptacle body. The operation of the device, however, is the same as already described in connection with the form shown in Figures 1 and 2.

Figure 5 shows how similar means may be employed in connection with a switch member 27. In this modification, however, another form of notched connecting pieces 28, 28 is provided, consisting of two separate members connected by inwardly extending portions 28a, 28a at their upper ends, as shown. In this form the yielding of the members 28a, 28a will not perhaps be so marked as in the case of the preferred form shown in the previously described figures, but in other respects the use and operation of the device are substantially the same.

Figure 6 shows my invention as applied to a lighting fixture 30, which includes a base plate 31 adapted to be attached flatwise to the wall over the outlet box. In this form, the notched end members 15, 15 and spring cross member 16 may be substantially the same as previously described, and the base plate 31 is adjustably attached directly thereto by a screw member, as by a hollow threaded piece 32 having a head 32a which engages the outer face of base plate 31. The operation of this device is essentially the same as with other forms of fixtures hereinabove described, the base plate being clamped against the wall by screwing down the threaded member 32 and increasing tension on the yielding cross member 16 and notched arms 15, 15 which engage the margins of the outlet box cover, as before. As an especial advantage, it will be observed that this application of my invention eliminates the necessity of providing fixture studs in the box.

Although I have shown and described certain preferred forms and arrangements of my invention as applied to specific types of fittings, it will be understood that it may also be applied to other fittings utilized in connection with outlet boxes, or to fixtures mounted outside said boxes, and that various forms of modifications may be made without departing from the spirit and scope of my invention as defined in the appended claims.

I claim:

1. In combination with an outlet box having a fixture opening, a pair of oppositely disposed yielding members adapted to engage the opposed margins of said box opening, a fixture, a cover plate forming a part of said fixture, said plate extending laterally beyond said fixture opening and adapted to engage the outer surface of the wall surrounding said fixture opening, and means forming a detachable connection between said cover plate and said yielding members and operable to increase the tension of the latter tending to hold against said box margins.

2. In combination with an outlet box having a fixture opening, a pair of oppositely disposed yielding members insertable between the margins of said box opening and engageable thereunder, a fixture, a cover plate forming a part of said fixture, said plate extending laterally beyond said fixture opening and adapted to engage the outer surface of the wall surrounding said fixture opening, and threaded means forming a detachable connection between said cover plate and said yielding members and operable to increase the tension of the latter tending to hold them against said box margins.

3. In combination with an outlet box having a fixture opening, a pair of oppositely disposed parallel notched members yieldingly connected together and adapted to engage the opposed margins of said box opening, a fixture, a cover plate forming a part of said fixture, said plate extending laterally beyond said fixture opening and adapted to engage the outer surface of the plaster surrounding said fixture opening, and threaded means forming a detachable connection between said cover plate and said yielding members and operable to increase the tension of the latter tending to hold them against said box margins.

4. In combination with an outlet box having a fixture opening, a pair of oppositely disposed yielding members adapted to engage the opposed margins of said box opening, a fixture, a cover plate forming a part of said fixture, said plate extending laterally beyond said fixture opening and adapted to engage the outer surface of the wall surrounding said fixture opening, and means forming a detachable connection between said cover plate and said fixture and adapted to draw said fixture and cover plate together against the tension on said yielding members.

5. In combination with an outlet box having a fixture opening, a pair of oppositely disposed yielding members insertable between the margins of said box opening and engageable thereunder, a fixture, a cover plate forming a part of said fixture, said plate extending laterally beyond said fixture opening and adapted to engage the outer surface of the wall surrounding said fixture opening, and threaded means detachably securing said cover plate to said fixture and adapted upon drawing said cover plate and fixture together to increase the tension tending to hold said yielding members in engagement with said box margins.

6. In combination with an outlet box having a fixture opening, a pair of oppositely disposed yielding members adapted to engage the opposed margins of said box opening in a plurality of predetermined positions, a fixture, a cover plate forming a part of said fixture, said plate extending laterally beyond said fixture opening and adapted to engage the outer surface of the wall surrounding said fixture opening, and threaded means detachably securing said cover plate to said fixture and adapted upon movement to fully secured position to increase the tension tending to hold said yielding members in engagement with said box margins.

7. In combination with an outlet box having a fixture opening, a pair of opositely disposed substantially parallel notched members yieldingly connected to said fixture and adapted to engage the opposed margins of said box opening, a fixture, a cover plate forming a part of said fixture, said plate extending laterally beyond said fixture opening and adapted to engage the outer surface of the plaster surrounding said fixture opening, and threaded means detachably securing said cover plate to said fixture and adapted upon drawing said cover plate and fixture together to increase the tension of said yielding members on said box margins.

8. In combination with an outlet box having a fixture opening, a pair of oppositely disposed substantially parallel notched members yieldingly engageable between the opposed margins of said box opening, a fixture, member extending laterally beyond said fixture opening and adapted to engage the outer surface of the wall surrounding said fixture opening, and threaded means forming a detachable connection between said fixture member and said notched members, and adapted upon screwing said fixture member toward said box opening to increase the tension of said yielding members on the margins of the latter.

OSCAR G. ALMCRANTZ.